US012678958B2

(12) United States Patent
Pizzato et al.

(10) Patent No.: US 12,678,958 B2
(45) Date of Patent: Jul. 14, 2026

(54) SYSTEM FOR CONTROLLING SAFETY PROTECTIONS FOR INDUSTRIAL MACHINES OR PLANTS

(71) Applicant: PIZZATO ELETTRICA S.R.L., Marostica (IT)

(72) Inventors: Marco Pizzato, Marostica (IT); Giuseppe Pizzato, Marostica (IT)

(73) Assignee: PIZZATO ELETTRICA S.R.L., Marostica (IT)

( * ) Notice: Subject to any disclaimer, the term of this patent is extended or adjusted under 35 U.S.C. 154(b) by 141 days.

(21) Appl. No.: 18/289,579

(22) PCT Filed: May 12, 2022

(86) PCT No.: PCT/IB2022/054430

§ 371 (c)(1),
(2) Date: Nov. 6, 2023

(87) PCT Pub. No.: WO2022/243800

PCT Pub. Date: Nov. 24, 2022

(65) Prior Publication Data

US 2024/0238978 A1 Jul. 18, 2024

(30) Foreign Application Priority Data

May 18, 2021 (IT) ........................ 102021000012845

(51) Int. Cl.
*B25J 9/16* (2006.01)
*B25J 19/06* (2006.01)
(Continued)

(52) U.S. Cl.
CPC ........... *B25J 9/1676* (2013.01); *B25J 19/061* (2013.01); *G05B 19/4061* (2013.01);
(Continued)

(58) Field of Classification Search
CPC ... B25J 9/1676; B25J 19/061; G05B 19/4061; G05B 19/406; G07C 9/00309;
(Continued)

(56) References Cited

U.S. PATENT DOCUMENTS 8,922,333 B1 * 12/2014 Kirkjan .............. G07C 9/00309
9,782,897 B2 * 10/2017 Watanabe .............. B25J 9/1674
(Continued)

FOREIGN PATENT DOCUMENTS

WO WO-2021009602 A1 * 1/2021 ........... E05B 17/226

*Primary Examiner* — Ellis B. Ramirez
(74) *Attorney, Agent, or Firm* — Rivka Friedman

(57) ABSTRACT

A system for the safe control of safety protections comprises at least one first control device (2) placed outside the safety perimeter (P) for sending commands to stop and enable the machine or plant (M) following the opening/closing of the accesses (A1, A2), a first safety switch (3) placed close to one or more of the accesses (A1, A2) for their locking and/or unlocking, one or more actuators having a transponder with identification code for interacting with the first control device and/or safety switch, at least one control unit connected to the first control device and to the safety switch to receive the actuation commands and enable the operation of the machine or plant (M) between an operating condition and a safety operating condition. Second means are also provided for enabling the exit from the safety perimeter (P) for one or more operators.

10 Claims, 8 Drawing Sheets

(51) Int. Cl.
    *G05B 19/4061*      (2006.01)
    *G07C 9/00*      (2020.01)
    *G07C 9/22*      (2020.01)

(52) U.S. Cl.
    CPC ..... *G07C 9/00309* (2013.01); *G07C 9/00896*
                 (2013.01); *G07C 9/22* (2020.01); *G07C*
                                 *2009/00793* (2013.01)

(58) Field of Classification Search
    CPC ........ G07C 9/00896; G07C 9/22; G07C 9/20;
                  G07C 9/27; G07C 2009/00793; E05B
                                        47/0001
    USPC .......... 700/255, 249, 257; 70/275; 340/5.22,
                                           340/5.23
    See application file for complete search history.

(56)                 References Cited

U.S. PATENT DOCUMENTS

| | | | |
|---|---|---|---|
| 9,951,548 B2 * | 4/2018 | Oda ......................... | E05F 15/40 |
| 2009/0069943 A1 * | 3/2009 | Akashi ................... | B25J 9/1676 |
| 2009/0072631 A1 * | 3/2009 | Iida .......................... | B25J 21/00 |
| 2012/0262727 A1 * | 10/2012 | Bonin ................... | B25J 9/1676 |
| 2013/0020817 A1 * | 1/2013 | Pullmann .................. | F16P 1/02 |
| 2016/0371908 A1 * | 12/2016 | Dow ....................... | F16P 3/147 |
| 2018/0321661 A1 * | 11/2018 | Main-Reade ...... | G05B 19/4185 |
| 2020/0193364 A1 * | 6/2020 | Wilson, Jr. .......... | G06Q 10/087 |

* cited by examiner

1

1

4

3

10

A1

P

10

A2

M

2

3

SYSTEM FOR CONTROLLING SAFETY PROTECTIONS FOR INDUSTRIAL MACHINES OR PLANTS

TECHNICAL FIELD

The present invention finds application in the field of safety systems for industrial machines and plants and particularly relates with a system and the relative method of operation for the safe control of accesses to a safety perimeter or similar protection system for machines or industrial plants.

STATE OF THE ART

Use of safety perimeters or barriers to control access to industrial machines or plants is known, in particular when the presence of personnel near moving parts of the machine or plant represents a condition of potential danger.

Typically, these protections are provided with one or more accesses for the entry and/or exit of operators within the working area.

The accesses are also associated with safety control systems designed to allow entry only in the presence of proper safety conditions for the type of machine present inside.

Generally, the above systems are provided with safety devices arranged at the accesses and designed to avoid the access to be opened during normal operation of the machine or to bring the machine into safe condition upon the opening of the access, for example by blocking it or slowing it down.

The safe control systems have also to be designed to prevent the machine from being inadvertently restarted, at least in the normal operating mode, when one or more operators are present inside the perimeter, as well as to avoid closing the accesses in such conditions or to allow opening from the inside if they need to be closed.

For example, US2017/336026, in the name of the same Applicant discloses a safety switch provided with a mushroom-shaped emergency button designed to be positioned inside the protective barrier to be operated also from the inside.

Instead, US2009/0072631 provides that a TAG reader is placed inside the perimeter which enables the opening of an access to allow exit.

If the perimeter is provided with several accesses, it is also necessary to coordinate the opening/closing of the accesses, for example by allowing the opening of a single access at a time or preventing one of the accesses from being opened as long as another access has not been closed and possibly blocked.

Last but not least, it may be necessary to allow the restart of the machine or system, even if at a controlled speed and in safe conditions, even in the presence of an operator within the perimeter.

To this end, some safe control system solutions are known that allow the system or a part thereof to be restarted in a safe condition directly by an operator placed within the perimeter.

The known "trapped keys" solutions require that the operator enter through one of the accesses by unlocking it, by extracting a mechanical key from a safety switch placed at the access.

In this way, the operator will have the opportunity to carry the key with him/her inside the perimeter to prevent the system from being restarted with him/her inside.

Once inside the perimeter, and after closing the access, or after leaving it open and locked in the open position, the operator may restart the machine or plant in safe mode.

To this end, he/her may use the same key extracted previously or another key present in the perimeter and which can only be taken by inserting the first key in a special device.

This key for restarting the machine in safe mode must be inserted in a special restart device inside the perimeter.

Restarting the machine or system in standard mode will instead be possible only once the operator has left the perimeter and has reactivated the machine or plant by following the correct restart procedures.

A first drawback of the above solution is represented by the fact that the access control devices are mainly of the mechanical type, with all the limits connected thereto, starting with the difficult and intuitive operating sequence.

In particular, these solutions have some safety limits related in particular to the use of actuator systems, above all keys and the corresponding mechanical locking/unlocking locks.

As matter of fact, under certain conditions these solutions cannot be considered highly safety as they do not allow the exact identification of the operator and also do not prevent access from being locked or unlocked from the outside even with the operator present in the perimeter by means of an activation key or other similar device.

The use of mechanical keys with electronic coding, such as those described in US2019051077, only partially solve these drawbacks as they always make it possible, at least theoretically, to use alternative release devices, being however bound to a mechanical type recognition.

SCOPE OF THE INVENTION

The object of the present invention is to overcome the above drawbacks by providing a system for the safe control of safety protections for industrial machines or plants which is characterized by particular efficiency.

A particular object is to provide a system for the safe control of safety protections for industrial machines or plants that guarantees high levels of safety, preventing potential actions of unauthorized opening of accesses as well as potential restarting of the machine or plant in unsafe conditions.

Still another object is to provide a system for the safe control of safety protections for industrial machines or plants which does not use mechanical type actuators.

Another object is to provide a system for the safe control of safety protections for industrial machines or plants which is convenient to use.

These objects, as well as others that will become more apparent hereinafter, are achieved by a system for controlling safety protections for industrial machines or plants which, according to claim 1, comprises first enabling means for enabling entry into the safety perimeter for one or more operators, said first enabling means comprising at least one first control device placed in correspondence with at least one of said one or more accesses, positioned externally to the safety perimeter, for sending stop and/or start and/or enabling commands of the machine or plant following the opening/closing of one of the accesses, verification means for verifying the entry/exit of one or more operators through one or more of said accesses, one or more actuators each having a unique recognition system of a respective operator by means of an identification code and suitable for interacting with said first enabling means and/or said verification means for sending respective actuation commands, at least one control unit operatively connected to said first enabling means and said verification means for receiving said actuation commands and enabling operation of the machine or industrial plant present in the safety perimeter, or at least part of the machine or system, between a first steady state operating condition and a second operating condition depending on the type of activation commands received, second enabling means for enabling the exit from the security perimeter for one or more operators associated with at least one of said one or more accesses, said second enabling means comprising at least one second control device placed in correspondence with at least one of said one or more accesses and positioned inside the safety perimeter, for sending commands to the machine or plant.

The system thus implemented will be free from the use of mechanical systems and keys, guaranteeing, thanks to the possibility of electronic coding and recognition, all the highest safety standards both as regards any unsafe operation of the machines with operators still present in the perimeter and against possible unauthorized access attempts.

Advantageous embodiments of the invention are obtained in accordance with the dependent claims.

BRIEF DISCLOSURE OF THE DRAWINGS

Further features and advantages of the invention will become more apparent in the light of the detailed description of some preferred but not exclusive embodiments of the system according to the invention, shown by way of non-limiting example with the aid of the accompanying drawing tables wherein.

BEST MODES OF CARRYING OUT THE INVENTION

FIGS. 1-5 show a schematic and not exclusive embodiment of a system according to the invention applied to a protection perimeter inside which an industrial machine defined by a robotic arm is located.

However, it is clear that the representation of the system must be understood exclusively for illustrative and schematic purposes, as both the safety perimeter and the machine or plant may be of greater complexity and made according to any scheme, method and function.

In particular, the perimeter or safety protection P, which is shown in the figures having two accesses A1 and A2 arranged on two opposite walls, may also have a single access or even two accesses placed on the same wall, or on contiguous walls or in any case not facing each other or, again, may have more than two accesses arranged according to any distribution.

In this embodiment, the system, globally indicated with 1, comprises at least one first control device 2 located at one of the accesses A1, outside the safety perimeter P, and whose function will be to enable the entry of one or several operators within the safety perimeter P by sending one or more stop or enabling commands of the machine or plant M following the opening or closing of the access A1.

Therefore, the system 1 comprises verification means for verifying the entry/exit of one or more operators through one or more of these accesses A1, A2.

According to the preferred but not exclusive configuration of the figures, the verification means will also be designed to evaluate the opening/closing condition and possible locking of the accesses.

In particular, in this embodiment, the verification means comprise at least one first safety switch 3 placed in close to at least one or to all the accesses A1, A2, outside the perimeter P, to allow their opening or closing once have been enabled and unlocked.

Figure 8:
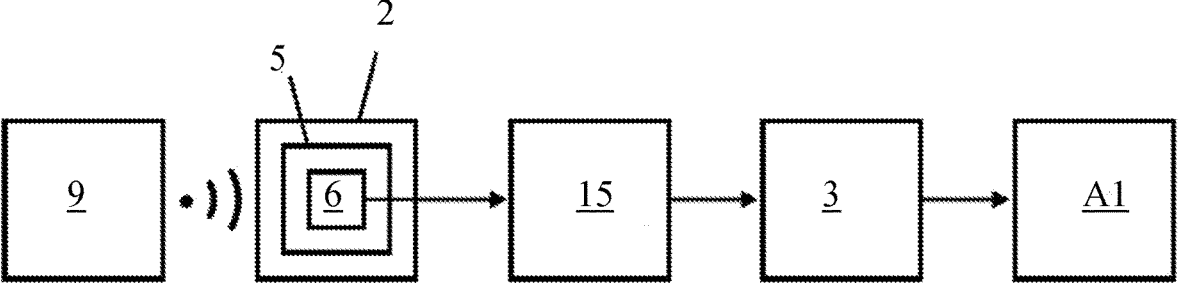
FIG. 8 shows an interaction diagram between the various parts of the system of FIG. 1 in an opening/closing step of an access from the outside.
Figure 9:
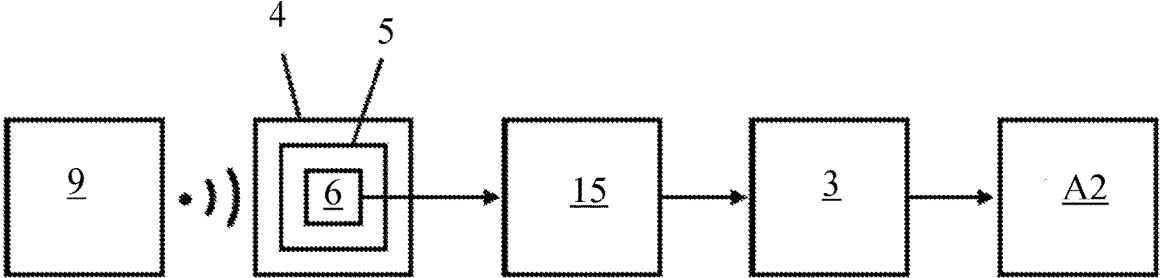
FIG. 9 shows an interaction diagram between the various parts of the system of FIG. 1 in an opening/closing step of an access from the inside.

One or more actuators, shown schematically in FIGS. 8 and 9 and indicated with 9, are also provided, each having a transponder with identification code and adapted to interact with the first control device 2 and/or the first safety switch 3 for sending respective activation commands.

These activation commands will be transmitted to a control unit, also schematized in FIGS. 8 and 9 and referred as 15, which may be arranged either close to the perimeter P, possibly integrated in one of the safety devices and switches, or in a remote position and which may possibly also serve more than one system.

The control unit 15, provided with a suitable processor, will be operationally connected to first enabling means for enabling the entry and to the verification means, by means of common electrical wires or preferably by means of suitable communication buses which may be of the safe or non-safe type, depending on the needs.

Different connection methods, including wireless, of a safe or non-safe type, may be provided without thereby departing from the scope of protection of the present invention.

The control unit 15 will have the task of receiving the activation commands and enabling the opening and/or locking/unlocking of the selected access and at the same time, or with a programmed delay, switch the operation of the machine or industrial plant M present in the safety perimeter P, or at least part of the machine or plant M, between a first operating condition of steady state and a second operating condition which may be safety condition or any other operating condition other than that of steady state.

For example, the second operating condition may be a condition of plant shutdown or reduced operation, depending on the type of activation commands received and according to typical schemes for this type of system.

Access A1, or accesses A1, A2, are also provided with second enabling means for enabling the exit from the safety perimeter P for one or more operators who have entered previously.

These second enabling means comprise at least one second control device 4 placed in correspondence with at least one of the accesses A1, A2 and positioned inside the safety perimeter P for sending commands to the machine or plant M.

Optionally, the second control devices 4 may also be associated with safety switches placed within the perimeter P or with other verification means for verifying the entry/exit of the operators.

Furthermore, according to variants not illustrated, the safety switches may be arranged both internally and externally or also arranged only internally.

According to the preferred but not exclusive embodiments of the figures, described in more detail below, both the first control device 2 and the second control device 4 will be provided with respective electronic drives 5 provided with respective reading means 6, both visible in more detail in FIGS. 6 and 7, adapted to interact with a respective actuator 9 by receiving at least one identification code or data of one or more operators. It is understood that each actuator 9 may be designed to communicate with a single control device 2, 4 or with several control devices 2, 4 or with all control devices 2, 4. The electronic drives 5 may be physically distinct from the respective safety devices or switches or incorporated therewithin.

Each of these codes will be transmitted by the respective electronic drive 5 and will define the above actuation command, which the respective control device 2, 4 will transmit to the control unit, which will check whether an authorization to entry into the perimeter P is associated with this code to enable the opening of the interrogated access A1, A2 and/or the lock/unlock thereof.

The system 1 so designed will allow the management of the accesses and exits with respect to the perimeter P and the operation of the machine M without the use of mechanical or electromechanical devices, such as keys or similar, so as to guarantee all the highest safety standards, typical of electronically operated solutions.

To guarantee complete safety for the operators, the control unit 15 will be designed to enable the passage of the machine or plant M from the second operating condition, that could be a safety or other operating condition other than the steady one, to the first operating condition of full operativity only after receipt of codes or data certifying the exit of all operators from the perimeter P.

A particular method of access control, for example in the case in which the perimeter P comprises at least one first access A1 and at least one second access A2 for the entry and/or exit of the operators, the control unit will verify that it has received all the codes certifying both the entry and exit of all operators.

To this end, the first enabling means comprise a first control device 2 located at each access A1, A2, outside the safety perimeter P.

Both of the first control devices 2 are suitable for sending commands to stop and enable the machine or system following the opening/closing of the respective accesses A1, A2.

The enabling command will be sent to a corresponding first safety switch 3 located at the respective access A1, A2, externally thereto.

In general, the safety switch 3 will comprise a switching device 7 anchored to the fixed frame of the access A1, A2 and which houses the switching means, not visible in the FIGURE, of one or more power and/or service circuits of the machine or plant, and an actuator device 8 which will interact with the switching means upon opening/closing the access A1, A2 for opening/closing the above circuits.

Furthermore, in a known manner, the interaction between the switching device 7 and the respective actuator device 8 may be designed to allow the locking of access A1, A2 and prevent its reopening in the absence of enabling by the control unit.

Some preferred safety switch configurations are described below.

Similarly, each access A1, A2 will be equipped with a second control device 4 placed inside the safety perimeter P for locking and/or unlocking the second access from the inside of the perimeter P itself.

Possibly, one or more of the second control devices 4 may be associated with a respective second safety switch, placed inside the perimeter P, on the opposite side to the respective corresponding second control device 4.

However, preferably, even if not exclusively, each access A1, A2 will be associated with a single safety switch, which may be placed externally, as in the attached FIGURES, or internally.

In a first preferred but not exclusive embodiment, each actuator 9 will comprise a respective transponder provided with RFID (Radio Frequency IDentification) tag with identification code.

In this text, the term TAG refers to an electronic device consisting of a chip and an antenna designed to communicate by sending/receiving coded signals.

The transponder will for example be integrated in a badge, token or similar device available to an operator, not illustrated as it is known per se.

In turn, the reading means integrated in the control devices 2, 4 will comprise an RFID reader provided with an antenna suitable for receiving the identification code associated with a corresponding actuator for sending it to the control unit 15.

However, it will be possible to provide other types of electronic actuators 9, such as magnetic or electromagnetic sensors, optical sensors, actuators operating by means of biometric parameters, with Hall effect or, again, tokens, smartphones, wearable devices, such as a bracelet, key ring, jacket, suit, or implanted inside the body, biometric recognition systems, such as a fingerprint recognition system, system for reading the pupil, 2D or 3D facial recognition system or for the recognition of others parts of the body.

Consequently, the reading means will be designed to communicate with the specific type of actuator 9.

According to a preferred operating mode, one or more operators provided with respective actuators 9 with relative identification code will request access to the enabling means by approaching their own actuator 9 to the reading means associated with the access A1, A2 through which enter inside, i.e. to the respective first control device 2.

The control unit 15 will receive the identification code and, if it checks that it matches one of the authorized codes, it will communicate with the corresponding switch 7 to unlock the manned access A1, A2.

At the release request, the machine or plant M may be switched from the first to the second operating condition, which can be a condition of plant shutdown or reduced operation. Alternatively, this step may be determined by the opening of the access.

Once the operator or operators have entered, it will also be possible to close the access A1, A2, or leave the access A1, A2 open or locked in the open position.

The operator may possibly interact with the drive 5 of the second control device 4 located within the perimeter P to communicate the closure of the access A1, A2.

In this condition, the control unit 15, having not yet received the information that all the operators have left the perimeter P, will not allow the machine or plant M to return to operating conditions but will only allow safe operation or reduced ones, possibly allowing it to pass from a condition of total plant shutdown to a condition of reduced operation, if this possibility is provided for by the identification code transmitted and associated with the actuator 9.

Upon exiting the perimeter P, the operator will bring his actuator 9 close to the reading head of one of the second internal control devices 4 to obtain authorization to open the access A1, A2.

The exit access may be the same entry access or a different access, if provided.

Once exiting, the operator will bring his actuator 9 close to the reading head 6 of the first control device 2 located outside the exit access.

In this way, the control unit 15 will receive the identification signal and will activate the corresponding safety switch 3 to obtain the locking of the access.

The restoration of the operating condition of steady operation will be allowed by the control unit 15 only when it has detected that all open accesses have been closed and possibly locked.

For this reason, the control unit 15 will check that the codes received by the first control devices 2 and the codes received by the second control devices 4 are equal in number and correspond to the same operator, so to be sure that all the operators have left the perimeter P.

For safety reasons, each access A1, A2 may also be provided with emergency commands that will allow the manual release of the accesses from the outside or inside and the simultaneous interruption in the operation of the machine or plant M.

FIGS. 1-4 show an operating sequence of the system 1 in a preferred but not exclusive embodiment.

In this configuration, each access A1, A2 is provided with a first outer control device 2 and a second inner control device 4, positioned on mutually opposite sides with respect to the access A1, A2 to be monitored.

Each access A1, A2 is also provided with a first safety switch 3 placed on the outer side, even if one or more of the accesses A1, A2 may also be provided with a second safety switch placed on the inner side.

In this embodiment, the safety switches 3 are of the safety handle type, such as the switches described in WO2021009602, WO2019229717 or WO2019229708, all in the name of the Applicant.

In addition, each safety switch 3 comprises a switching device 7 anchored to the fixed access frame and an actuator device 8 provided with a grip handle 10 and anchored to the movable part of the access.

In a known way, the actuator device 8 and the switching device 7 comprise means for the mutual remote communication, for example a system with RFID tag and receiving antenna, which will allow the switching device 7 to detect the proximity of the actuator device 8 and thus discriminating the open or closed access condition of the respective access A1, A2 to communicate it to the control unit.

Furthermore, again in a known manner, the actuator device 8 may comprise a retaining and centering element that will be inserted into a proper slot or centering hole provided in the switching device 7.

The latter will house inside a locking/unlocking mechanism of the actuator device 8 controlled by the control unit 15 according to the commands received, i.e. also on the basis of the identification codes detected by the reading means 6.

The mechanism will interact with the holding and centering element to keep it locked and prevent the access from opening or to free it and allow it to be opened.

According to a variant not shown, the switch may be electromechanically operated and the holding element will also have the function of activating the switching means, instead of the above RFID/antenna tag system.

According to yet another variant, the actuator device may be without a retaining and centering element or be a proximity sensor with a non-contact actuator that detects the condition of open or closed door.

Figure 1:
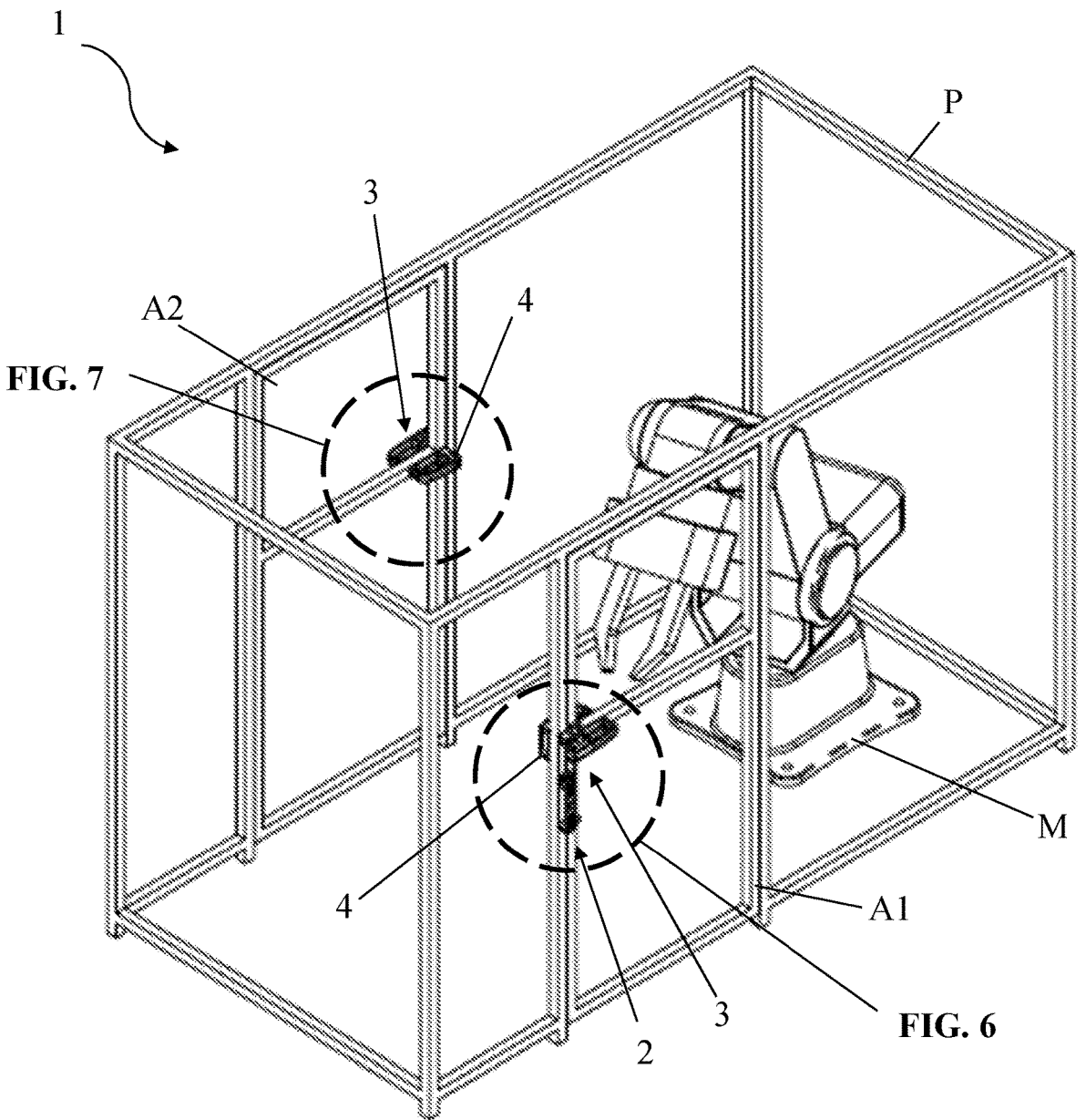
FIGS. 1 to 4 show a protection perimeter of a machine associated with a safe control system in a first embodiment and in four different operating configurations.
Figure 2:
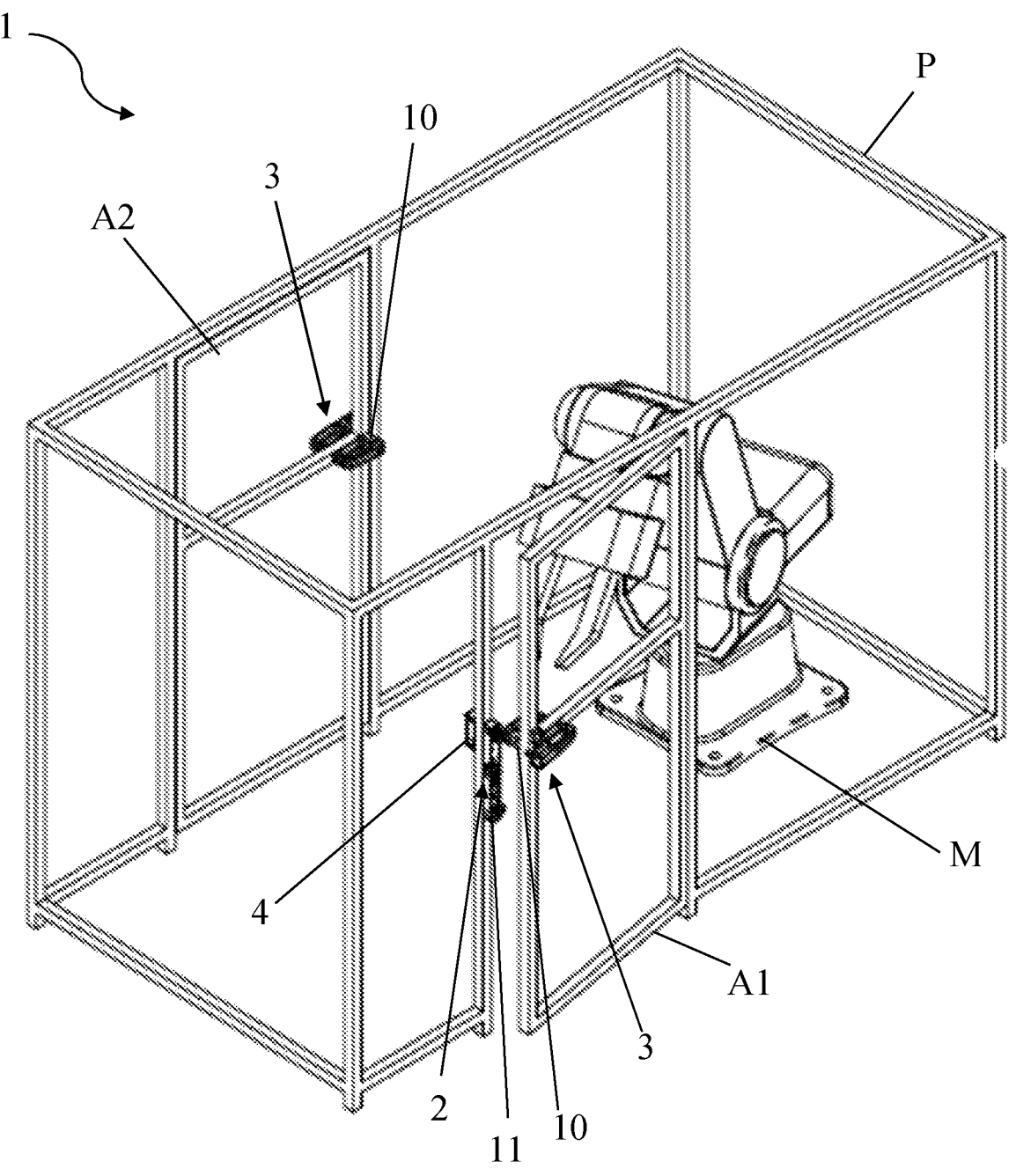
Figure 3:
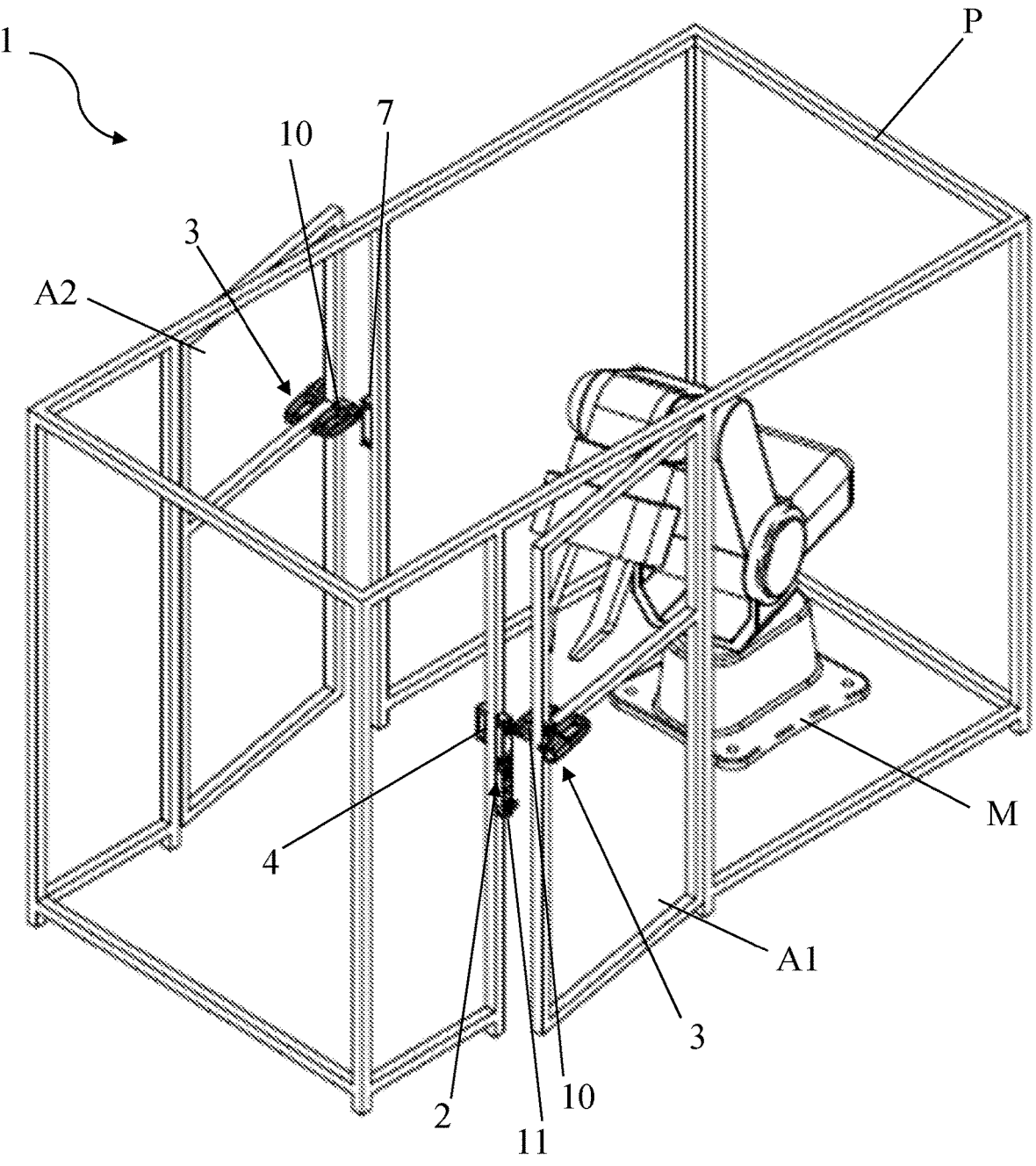
Figure 4:
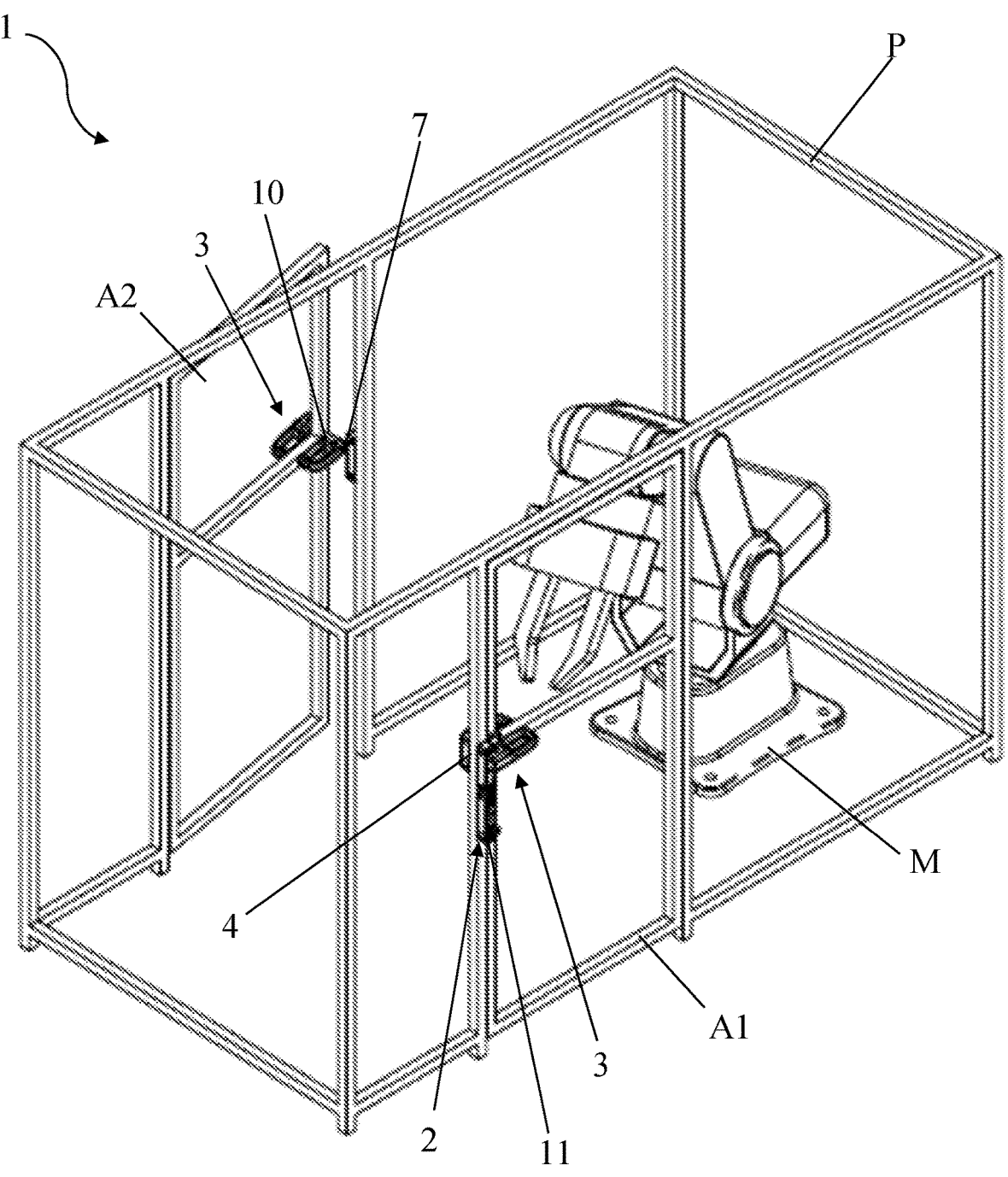
Figure 5:
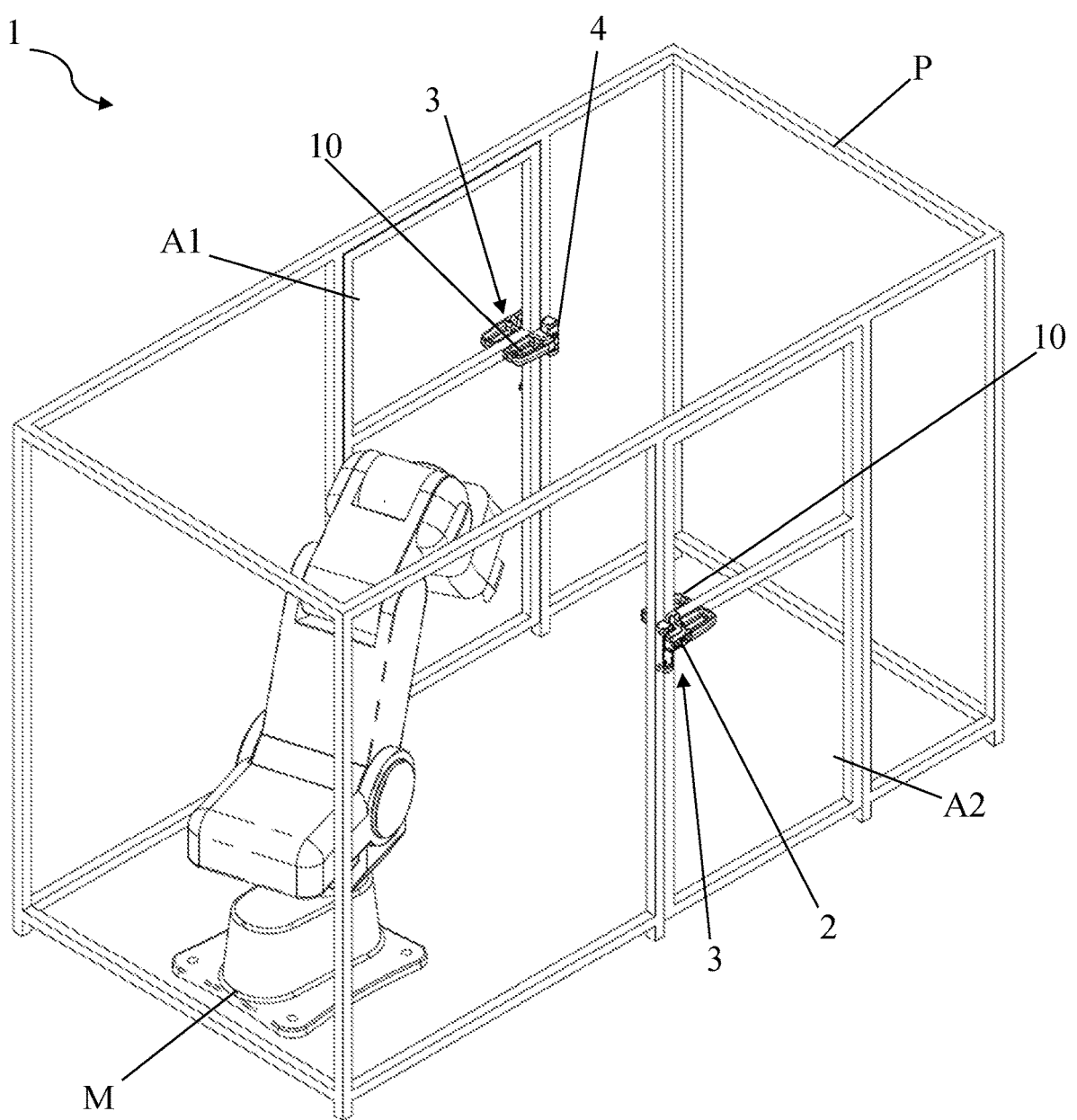
FIG. 5 is a view of the system according to the configuration of FIG. 1 and according to a different orientation.

FIG. 5 also shows that the second control device 4 located at the first switch A1 is associated with a safety switch 3 provided with a switching device 7 and a handle actuator device 8.

Figure 6:
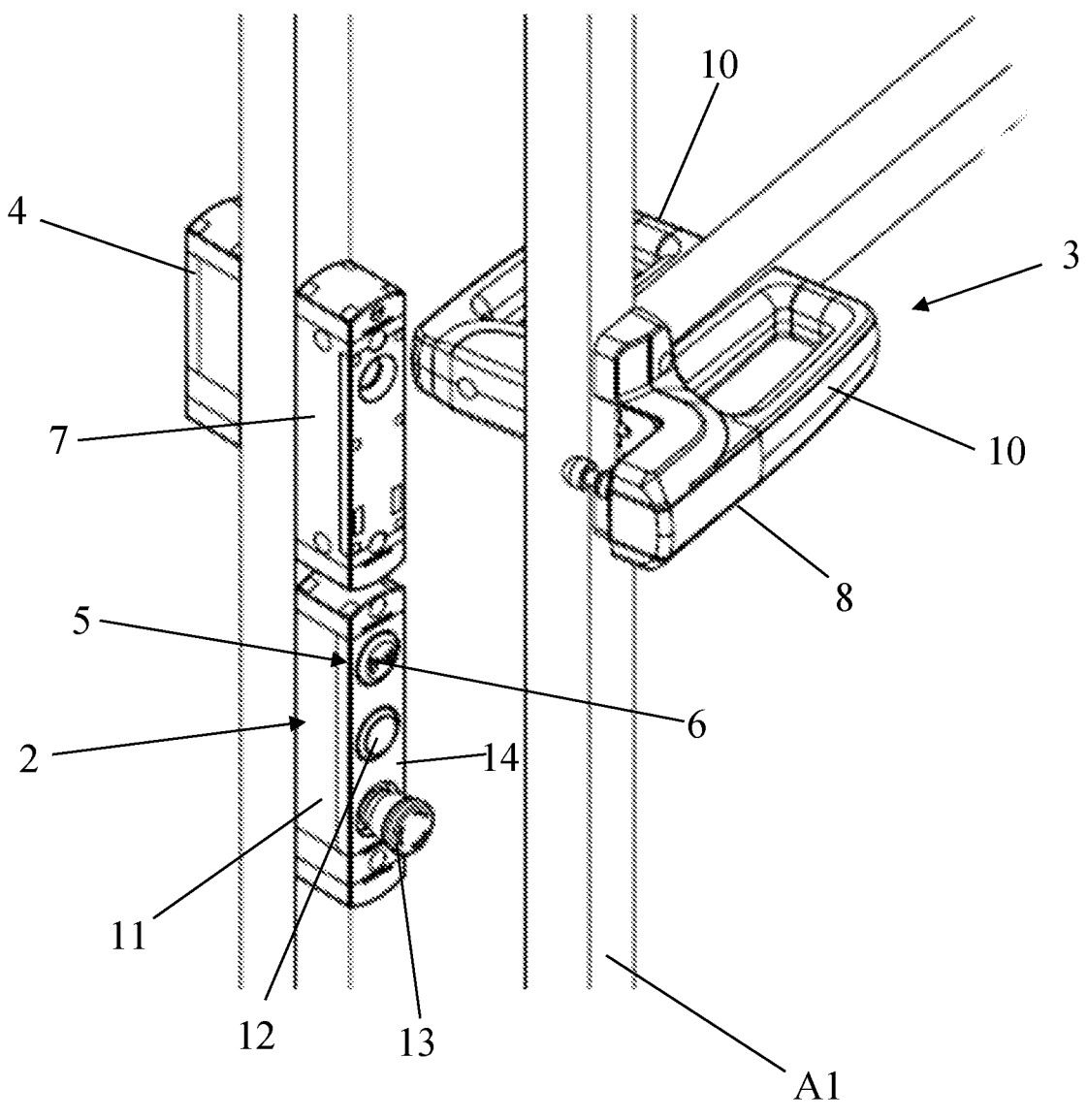
FIG. 6 illustrates a first detail of the system.

As visible from FIG. 6, externally at the first access A1 there is also a push-button panel 11, for example of the type described in WO2021009601, in the name of the same Applicant.

The push-button panel will be provided with a plurality of buttons or commands 12, 13, one of which can be an emergency button, for intervention on the circuits of the machine or plant M, directly or through the control unit 15.

The buttons or commands may possibly be combined with a touch screen or only a touch screen may be present to send auxiliary commands to the supervisory system of the machine or plant.

In this configuration, the first control device 2 is integrated into the push-button panel and has the reading head of the actuator 5 placed on the front face 14 of the push-button panel 11.

The control devices 2, 4 may also be integrated within one of the switching device 7 and the actuator device 8 of the respective safety switch 3, if present.

Figure 7:
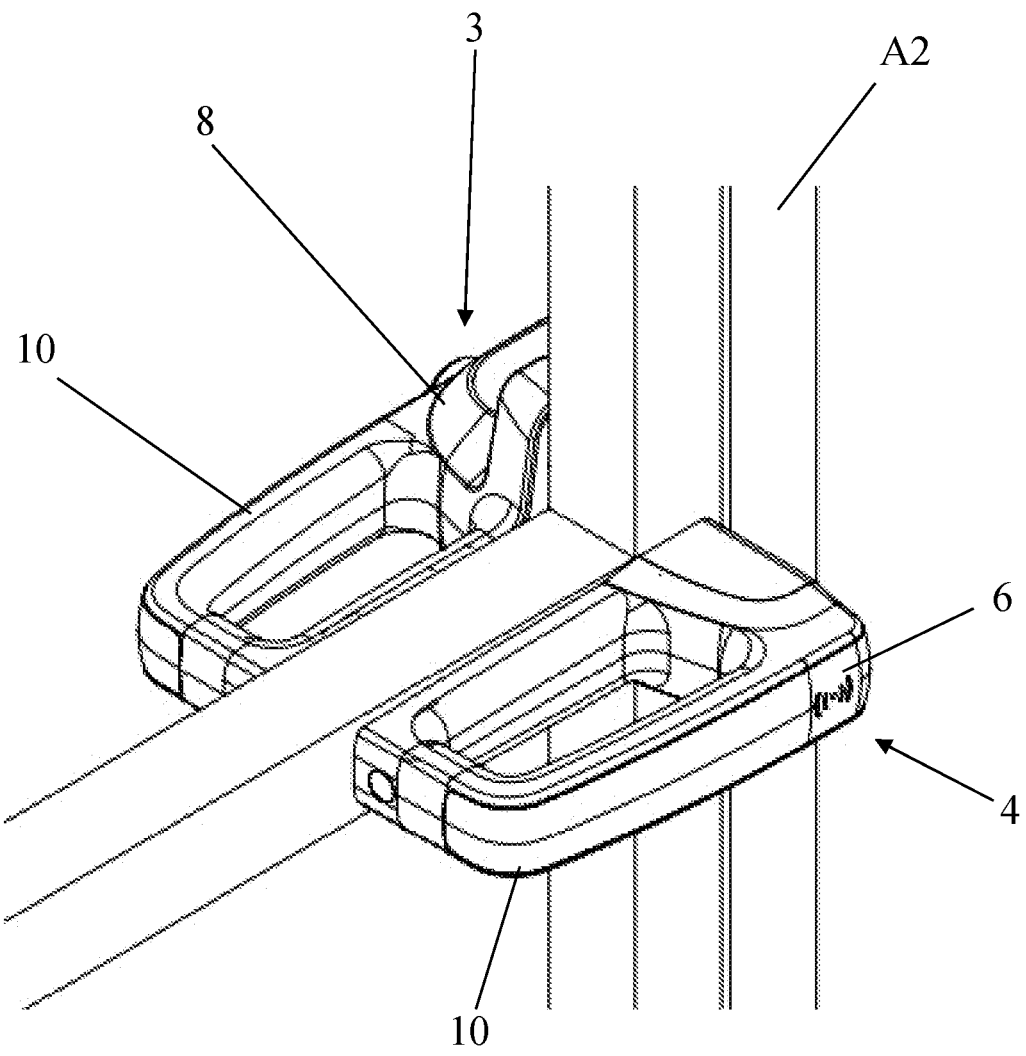
FIG. 7 illustrates a second detail of the system.

If the control device 2, 4 is not associated with a handle actuator device 8 placed on the same side of the respective access A1, A2, as in the case of the inner side of the second access A2 of the figures, the control device may also be provided with a handle 10, as more clearly visible from FIG. 7.

For safety reasons, the control devices and/or switches may be provided or associated with buttons or mechanical release handles placed internally and/or externally to allow entry and/or exit in the event of a power failure.

According to a variant not illustrated, the system may also comprise a single first external control device which will serve all the accesses and which may be placed at one of the accesses or spaced therefrom, i.e. a number of first control devices lower than the number of the accesses and wherein one or more of these devices will serve more accesses.

In the same way, the system may also comprise a single second inner control device which will serve all the accesses and which may be placed at one of the accesses or spaced therefrom, i.e. a number of second control devices lower than the number of accesses and wherein one or more of these devices will serve more accesses.

Furthermore, the accesses may also be without doors and, for example, consisting of other systems for enabling access to and exit from the perimeter, such as people-counting turnstiles suitable to prevent access to more than one person at a time, or vision systems or sensors, for example of the optical or photocell type, suitable to uniquely identifying and distinguishing the entry or exit of operators who cross an opening in the fence that is always open.

Moreover, light and/or sound signaling means may be provided which are controlled by the control unit and are suitable to provide indications relating to the operating condition of the machine or plant M and/or the condition of opening, closing or locking of the accesses and which may possibly also indicate the number of operators present inside the perimeter P.

The invention claimed is:

1. A system for controlling safety protections for industrial machines or plants, wherein a protection comprises one or more accesses (A1, A2) to a safety perimeter (P) or safety area of a machine or industrial plant (M), the system comprising:

first enabling means comprising at least one first control device (2) placed in correspondence with at least one of said one or more accesses (A1, A2), outside the safety perimeter (P), to send stop and/or start and/or enabling commands of the machine or plant (M) following the opening/closing of one of the one or more accesses (A1, A2);

verification means for evaluating an opened/closed condition and possible locking of one or more of said one or more accesses (A1, A2);

second enabling means comprising at least one second control device (4) different and separated from said at least one first control device (2) and placed in correspondence with at least one of said one or more accesses (A1, A2), inside the safety perimeter (P), for sending commands to the machine or industrial plant (M);

one or more actuators (9) each having a recognition system of a respective operator by means of an identification code and adapted to interact with said at least one first control device (2) and said at least one second control device (4), for sending respective actuation commands;

at least one control unit (15) operatively connected to said at least one first control device (2) and said at least one second control device (4), wherein said at least one first control device (2) and said at least one second control device (4) are suitable to generate respective actuation commands to be sent to said at least one control unit (15), wherein said at least one control unit (15) is configured to receive said actuation commands and enable the opening and/or locking/unlocking of a selected access of said one or more accesses (A1, A2) and switch the operation of the machine or industrial plant (M) inside the safety perimeter (P), or at least part of the machine or industrial plant (M), between a first full operative condition and a second operating condition as a function of the type of actuation commands received, wherein said at least one control unit (15) is configured to enable the machine or industrial plant (M) to switch from said second operating condition to said first full operative condition only following reception of codes or data certifying the exit of all operators from the safety perimeter (P).

2. The system as claimed in claim 1, wherein said at least one first control device (2) and/or said at least one second control device (4) are provided with a respective electronic drive (5) having respective reading means (6) adapted to interact with said one or more actuators (9) by receiving at least one identification code or data of one or more operators transmitted by said actuators (9) and defining said actuation commands and to transmit said at least one identification code or data to said control unit (15) for enabling and/or locking/unlocking at least one of the one or more accesses (A1, A2).

3. The system as claimed in claim 1, wherein the safety perimeter (P) comprises at least one first access (A1) and at least one second access (A2) for the entry and/or exit of one or more operators, characterized in that said enabling means comprise at least one first control device (2) and/or at least one second control device (4) located at each of said first and second access (A1, A2) and suitable for sending commands for stopping and enabling the machine or plant (M) following the opening/closing of the respective accesses (A1, A2).

4. The system as claimed in claim 1, wherein said verification means comprise for each access of said one or more accesses (A1, A2) at least one first safety switch (3) located externally and/or internally to the safety perimeter (P) and having a movable component (8) associated with the movable part of the access and a fixed component (7) associated with the fixed frame of the access and provided with a locking/unlocking mechanism of the movable component (8).

5. The system as claimed in claim 1, wherein said first and/or said second control devices (2, 4) are integrated in one of said movable component (8) or fixed component (7) of the corresponding safety switch (3).

6. The system as claimed in claim 1, wherein each of said actuators (9) comprises a respective RFID transponder with identification code.

7. The system as claimed in claim 6, wherein each of said reading means (6) comprise an RFID reader provided with an antenna suitable for receiving the identification code associated with a corresponding actuator (9) for sending it to said control unit (15).

8. The system as claimed in claim 1, wherein said actuators (9) and said reading means (6) are of the electronic type, such as sensors of the magnetic or electromagnetic, optical type or operating by means of biometric parameters.

9. The system as claimed in claim 1, wherein light and/or audible signalling means are provided which are controlled by said control unit (15) and are suitable for providing indications relating to the operating condition of the machine or plant (M) and/or to the condition of opening, closing or locking of said one or more accesses (A1, A2).

10. The system as claimed in claim 1, wherein said control unit (15) is adapted to enable the passage of the machine or plant (M) from said second operating condition to said first operating condition only in the presence of the following conditions:

reception by said control unit (15) of one or more first codes certifying the opening or closing from the outside of one of the one or more accesses (A1, A2) and each transmitted by a respective of said at least one second control devices (2);

reception by said control unit (15) of one or more second codes certifying the opening or closing from inside one of the one or more accesses (A1, A2) and transmitted by a respective of said at least one second control devices (4);

wherein the number of said first codes or data that said control unit (15) has received is equal to the number of said second codes or data that said control unit (15) has received or such as to ensure that each operator entered the safety perimeter (P) from one of said one or more accesses (A1, A2) has exit from the same said one or more accesses (A1, A2) or from a different of said one or more accesses (A1, A2).

* * * * *